US009916835B2

(12) United States Patent
Frey et al.

(10) Patent No.: US 9,916,835 B2
(45) Date of Patent: Mar. 13, 2018

(54) DIGITAL WIRELESS AUDIO TRANSMISSION SYSTEM

(71) Applicant: Sennheiser electronic GmbH & Co. KG, Wedemark (DE)

(72) Inventors: Tom-Fabian Frey, Braunschweig (DE); Satheesh Sukumar, Langenhagen (DE); Sven Wachtendorf, Wedemark (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 107 days.

(21) Appl. No.: 15/003,572

(22) Filed: Jan. 21, 2016

(65) Prior Publication Data

US 2016/0217796 A1 Jul. 28, 2016

(30) Foreign Application Priority Data

Jan. 22, 2015 (DE) ........................ 10 2015 201 087

(51) Int. Cl.

| | |
|---|---|
| ***G10L 19/00*** | (2013.01) |
| ***G10L 15/00*** | (2013.01) |
| ***G10L 15/16*** | (2006.01) |
| ***G10L 21/00*** | (2013.01) |
| ***G10L 25/00*** | (2013.01) |
| ***G10L 25/90*** | (2013.01) |
| ***H04B 17/00*** | (2015.01) |
| ***H04B 7/00*** | (2006.01) |
| ***H04N 13/02*** | (2006.01) |
| ***H04N 17/00*** | (2006.01) |

(Continued)

(52) U.S. Cl.
CPC ........... *G10L 19/005* (2013.01); *H04H 20/61* (2013.01); *H04H 60/11* (2013.01)

(58) Field of Classification Search
CPC ....... G10L 19/008; G10L 19/12; G10L 15/16; G10L 15/22; G10L 25/90; H05K 999/99; H04L 1/0026; H04L 1/071; H04L 1/20; H04L 1/0045; H04L 43/50; H04W 84/18;
(Continued)

(56) References Cited

U.S. PATENT DOCUMENTS 5,072,297 A * 12/1991 Kanazawa ............. H04N 7/088 348/480
5,271,011 A * 12/1993 McMullan, Jr. ... G11B 20/1806 386/E5.016

(Continued)

FOREIGN PATENT DOCUMENTS

WO 2014001605 * 1/2014
WO WO 2014/001605 1/2014

*Primary Examiner* — Anne L Thomas-Homescu
(74) *Attorney, Agent, or Firm* — Haug Partners LLP

(57) ABSTRACT

A digital wireless audio transmission system having a wireless receiving unit for wirelessly receiving a high-frequency signal. An HF analysis unit analyzes the received high-frequency data, detects errors in the transmission within a time window, and outputs the received data and first items of information in respect of the detected errors. A decoding unit converts/decodes the received high-frequency data into audio data. An error detection unit checks errors in the conversion of the decoding unit within a previously established time window and outputs second items of information in respect of errors during decoding of the received high-frequency data. An error rate is determined based on the first and second items of information. If the error rate exceeds a first threshold value then no audio signal is outputted. Only if the error rate falls below a second value, lower than the first value, is an audio output is then again effected.

8 Claims, 3 Drawing Sheets

(51) Int. Cl.
*H04N 17/02* (2006.01)
*H04N 7/12* (2006.01)
*H04N 11/02* (2006.01)
*H04N 11/04* (2006.01)
*G10L 19/005* (2013.01)
*H04H 20/61* (2008.01)
*H04H 60/11* (2008.01)

(58) Field of Classification Search
CPC . H03M 13/09; H03M 13/2957; G06F 11/104; G11B 20/1876
See application file for complete search history.

(56) References Cited

U.S. PATENT DOCUMENTS 5,710,781 A * 1/1998 Zinser .................... H04B 1/667 714/747
5,828,672 A * 10/1998 Labonte ................ H04L 1/0057 370/252
6,018,376 A * 1/2000 Nakatani ............ H04N 21/4341 348/464
6,098,044 A * 8/2000 Huang .................. G10L 19/167 704/500
6,170,073 B1 * 1/2001 Jarvinen ............... H03M 13/47 714/752
6,216,263 B1 * 4/2001 Elam ...................... H04N 7/163 348/E7.061
6,377,806 B1 * 4/2002 Tokuyoshi ............ H04W 36/06 370/331
6,393,281 B1 * 5/2002 Capone .............. H04B 7/18506 455/428
6,741,293 B1 * 5/2004 Obuchi .................... H04N 3/27 348/554
6,799,294 B1 * 9/2004 Chung .................. H04L 1/0054 714/752
6,819,711 B1 * 11/2004 Forde ........................ H04L 1/20 375/224
9,769,565 B2 * 9/2017 Fedosov ................ H04R 3/005
2002/0046382 A1 * 4/2002 Yang ..................... H03M 13/03 714/758
2003/0083024 A1 * 5/2003 Richenstein ........... H04H 20/62 455/99
2003/0090590 A1 * 5/2003 Yoshizawa ......... H04N 5/44513 348/569
2004/0022229 A1 * 2/2004 Vanness ................ H04L 1/0036 370/343
2004/0083110 A1 * 4/2004 Wang .................... G10L 19/005 704/500
2004/0205438 A1 * 10/2004 Chien ................... H03M 13/00 714/746
2004/0243905 A1 * 12/2004 Merritt .................. H04L 1/1614 714/758
2005/0154584 A1 * 7/2005 Jelinek .................. G10L 19/005 704/219
2006/0053352 A1 * 3/2006 Juncker ................... H04L 1/203 714/704
2007/0047737 A1 * 3/2007 Lerner ................... H04H 40/54 381/22
2007/0127604 A1 * 6/2007 Inoue ................. H04B 10/1149 375/341
2007/0192095 A1 * 8/2007 Braho ..................... G10L 15/01 704/232
2007/0198269 A1 * 8/2007 Braho ..................... G10L 15/06 704/270
2007/0242834 A1 * 10/2007 Coutinho ........... G10K 11/1788 381/71.8
2007/0250841 A1 * 10/2007 Scahill .................... G06F 9/542 719/320
2008/0168312 A1 * 7/2008 Banks ................... H04L 1/0015 714/39
2008/0219334 A1 * 9/2008 Brainos ................. H04L 1/0002 375/221
2008/0250463 A1 * 10/2008 Shibusawa ........... H04N 5/4401 725/75
2008/0320375 A1 * 12/2008 Hori ...................... H04L 1/0061 714/807
2009/0281797 A1 * 11/2009 Zopf ..................... G10L 19/005 704/207
2009/0282298 A1 * 11/2009 Zopf ..................... G10L 19/005 714/701
2009/0309978 A1 * 12/2009 Nakamura ........... H04N 17/004 348/192
2010/0002893 A1 * 1/2010 Theverapperuma . H04R 1/1083 381/82
2010/0080305 A1 * 4/2010 Guo ..................... H04N 19/895 375/240.27
2010/0091626 A1 * 4/2010 Kubo ..................... G11B 7/268 369/53.2
2010/0241425 A1 * 9/2010 Eksler ..................... G10L 19/12 704/220
2010/0251051 A1 * 9/2010 Sun ....................... G10L 19/005 714/747
2010/0281321 A1 * 11/2010 Sun ....................... H04L 1/0047 714/747
2010/0306598 A1 * 12/2010 Ackaret ................ G06F 11/073 714/47.1
2010/0324918 A1 * 12/2010 Almgren ............... H04W 28/24 704/502
2011/0029109 A1 * 2/2011 Thomsen ................ H03F 3/187 700/94
2011/0099008 A1 * 4/2011 Zopf ..................... G10L 19/005 704/219
2011/0125505 A1 * 5/2011 Vaillancourt ......... G10L 19/005 704/500
2011/0179320 A1 * 7/2011 Quere ................ H04N 21/2383 714/712
2011/0250851 A1 * 10/2011 Wendler ............... H04B 1/1027 455/67.13
2011/0311001 A1 * 12/2011 Lindenbauer ..... H04L 25/03006 375/340
2012/0224709 A1 * 9/2012 Keddem .................. H04B 1/46 381/74
2012/0256685 A1 * 10/2012 DelPapa ............. H02M 3/3387 330/127
2012/0314598 A1 * 12/2012 Sadek ................... H04W 16/14 370/252
2013/0093853 A1 * 4/2013 Iwami ................ H04N 13/0203 348/46
2013/0304244 A1 * 11/2013 Ojanpera ............. G11B 27/034 700/94
2014/0142957 A1 * 5/2014 Sung ..................... G10L 19/005 704/500
2014/0142958 A1 * 5/2014 Sharma ................... G10L 19/02 704/500
2014/0170979 A1 * 6/2014 Samanta Singhar ... G10L 25/60 455/41.2
2014/0220904 A1 * 8/2014 Wachtendorf ......... H04B 17/24 455/67.11
2014/0257800 A1 * 9/2014 Su ......................... G10L 19/005 704/220
2014/0380230 A1 * 12/2014 Venable .................. G06F 3/013 715/781
2015/0009874 A1 * 1/2015 Edara ................ H04W 52/0225 370/311
2015/0142452 A1 * 5/2015 Sung ..................... G10L 19/025 704/500
2016/0165059 A1 * 6/2016 Deng .................. H04M 7/0072 370/252
2016/0165060 A1 * 6/2016 Li ....................... H04M 7/0072 370/259
2017/0118326 A1 * 4/2017 Mani ....................... H04M 3/00
2017/0133017 A1 * 5/2017 Rajakumar ............. G10L 17/06

* cited by examiner

DIGITAL WIRELESS AUDIO TRANSMISSION SYSTEM

The present application claims priority from German Patent Application No. 10 2015 201 087.2 filed on Jan. 22, 2015, the disclosure of which is incorporated herein by reference in its entirety.

FIELD OF THE INVENTION

It is noted that citation or identification of any document in this application is not an admission that such document is available as prior art to the present invention.

The present invention concerns a digital wireless audio transmission system, in particular a wireless microphone system or a wireless pocket transmitter system for the wireless transmission of digital audio data.

Digital wireless audio transmission systems of that kind have a wireless transmitter and a wireless receiver which digitally and wirelessly transmit audio data, for example as real time streaming. In that case audio artefacts can occur, more specifically both during the wireless transmission by way of a high frequency path and also in processing of the transmitted audio data. Such audio artefacts can represent audible artefacts which are to be avoided.

In the German patent application from which priority is claimed the following documents were cited as state of the art: US 2004/0083110 A1, US 2014/0220904 A1 and WO 2014/001605 A1.

SUMMARY OF THE INVENTION

An object of the present invention is to provide a digital wireless audio transmission system which substantially avoids audible audio artefacts.

Thus there is provided a digital wireless audio transmission system, in particular a wireless microphone system or a wireless pocket transmitter system for the wireless transmission of digital audio data. The audio transmission system has a wireless receiving unit for wirelessly receiving a high frequency signal. The wireless receiving unit has an HF analysis unit for analyzing the wirelessly received high frequency data, for detecting errors in the wireless transmission within a previously established time window and for outputting the received data and first items of information in respect of the detected errors. The receiving unit further has a decoding unit for converting or decoding the received high frequency data into audio data. The audio transmission system further has an error detection unit for checking errors in the conversion of the decoding unit within a previously established time window and for outputting second items of information in respect of errors during decoding of the received high frequency data. An error rate can be determined based on the first and second items of information. If the error rate exceeds a first threshold value then no output of an audio signal takes place. It is only if the error rate falls below a second value which is lower than the first value that an audio output is then again effected.

According to the invention therefore a hysteresis is achieved when switching on again, wherein switching-on again is effected only if the error rate falls below a second lower threshold value. It is thus possible to ensure that repeated muting and unmuting of the audio signal are avoided.

According to an aspect of the present invention the wireless transmission is a wireless audio streaming with low latency.

According to an aspect of the present invention the decoder can perform error concealment.

According to the invention muting and unmuting of an audio output signal can be provided in dependence on the link quality of the wireless transmission path and/or the decoder quality.

According to a further aspect of the present invention the first and second threshold values are adjustable by a user, for example externally adjustable.

According to a further aspect of the present invention the first and second threshold values can be adjusted in dependence on the position of the audio transmission system and/or in regard to information about the installation location like for example the size of the hall and so forth.

According to the invention therefore it is possible to achieve an audio watchdog functionality, wherein the watchdog takes account of the error rate of the wireless audio transmission and/or decoding. In addition the audio watchdog functionality can also take account of the link quality of the wireless transmission.

According to an aspect of the present invention an audio signal to be output is muted or deactivated if the decoder in the receiving unit is no longer capable of concealing the errors present. In that way it is possible to avoid audible audio artefacts and the hysteresis effect by means of the first and second threshold values also makes it possible to avoid the audio output signal being rapidly and uncontrolledly switched on and off.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
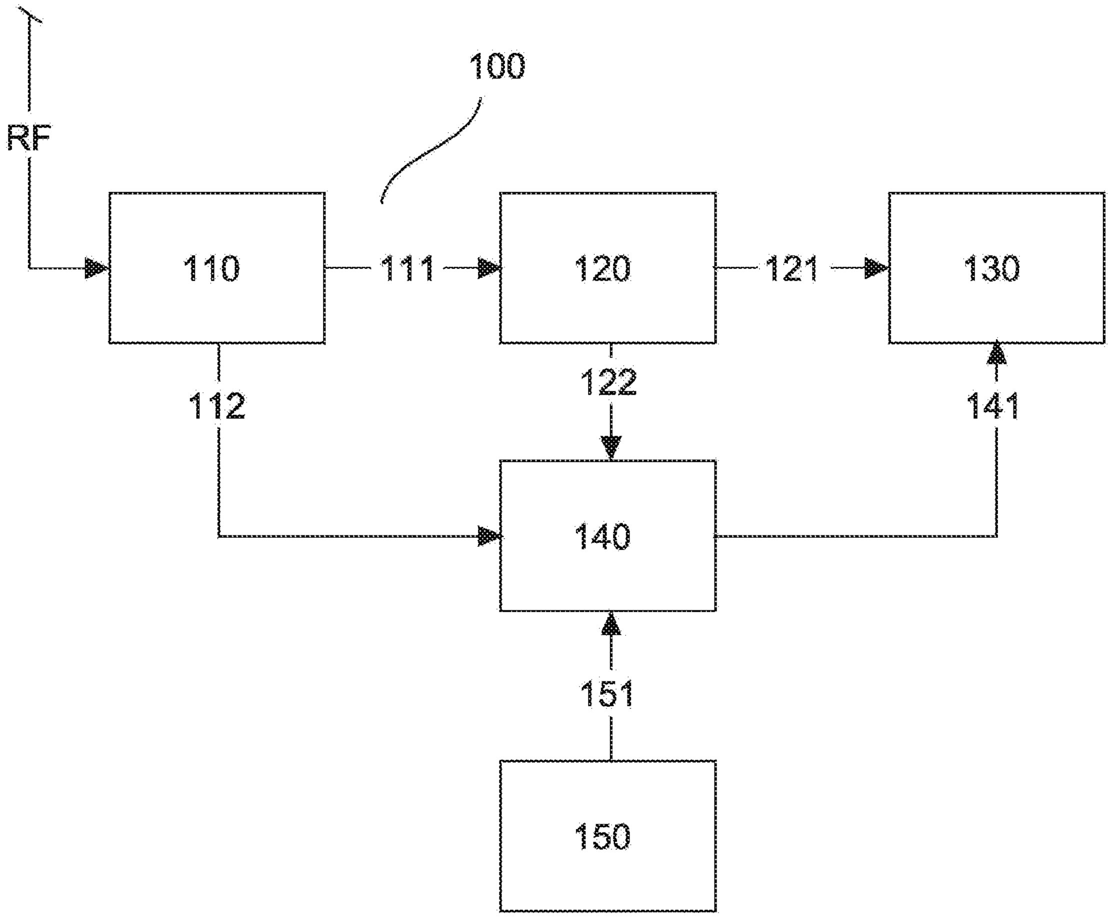
FIG. 1 shows a block circuit diagram of a receiving unit in a digital wireless audio transmission system according to a first embodiment.

FIG. 1 shows a block circuit diagram of a receiving unit in a digital wireless audio transmission system according to the invention. The wireless receiving unit 100 has a high frequency analysis unit 110, a decoder 120, an audio processing unit 130, an error detection unit 140 and optionally an error detection adjusting unit 150. A receiving unit 100 receives a high frequency signal RF by means of a high frequency analysis unit 110. The high frequency analysis unit 110 detects errors in the wireless transmission and outputs corresponding first items of error information 112 to the error detection unit 140. In addition the high frequency analysis unit 110 outputs the received data 111 to the decoder 120. The decoder 120 output decoded data 121 to the audio processing unit 130 and second items of error information 122 to the error detection unit 140. In that case the second items of error information 122 represent errors in decoding of the received data 111. In the error detection 140 the first and second items of error information 112, 122 are detected and optionally brought together to give an error rate. The ascertained error rate is compared to parameters 151 like for example a first and a second threshold value 151*a*, 151*b*. In that case the first threshold value 151*a* represents that threshold value, as from which the error rate is too high, so that the audio output by the audio processing unit 130 must be stopped or muted. In that case the second threshold value 151*b* represents that threshold value as from which the audio output by the audio processing unit 130 can be activated again. In that case the second threshold value 151*b* is lower than the first threshold value 151*a*. That provides a hysteresis effect when the audio data is output again by the audio processing unit 130. In that way it is possible to prevent the audio output from being rapidly and uncontrolledly switched on and off or activated or deactivated if the error rate in the wireless receiving unit 100 assumes values which represent the limit range of an acceptable audio transmission and in particular if the error rate remains in that limit range over a period of several seconds.

The invention is based on the idea that the receiving unit 100, even in the case of error-affected transmission up to a given limit on the error rate, is capable of producing an audio output of acceptable quality by estimation and possibly error concealment. If however the error rate exceeds a limit value then the quality of the audio output produced in that way is no longer acceptable and it is better then not to output any audio signal at all, and therefore to “mute” the audio output signal. As soon as the error rate falls again an acceptable audio signal can again be output. If however the error rate is in the limit range between acceptable and unacceptable audio quality over some seconds the comparison with only one limit value would lead to an uncontrolled rapid succession of activation and deactivation of the audio output and would thus produce a completely unusable audio output signal. To avoid that according to the invention there is provided a hysteresis effect for the mute function in conjunction with estimation and error concealment. In addition, for ascertaining the error rate, a respective time window is analyzed, in which there is a relatively large number of for example more than 100 sample values in order to prevent an unnecessary reaction on the part of the system with very short disturbances in transmission.

Figure 2A:
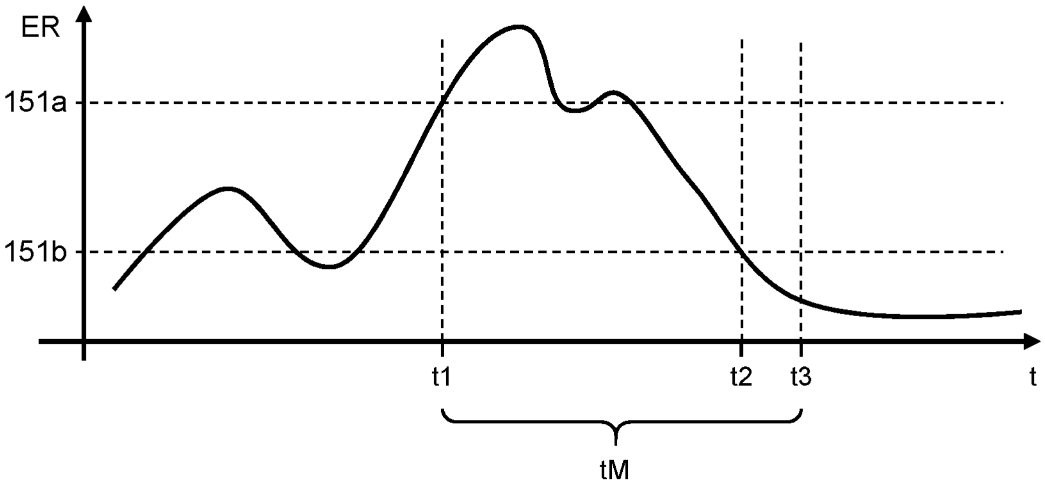
FIG. 2A shows a graph view of the variation in respect of time of an error rate in the wireless transmission in the digital wireless audio transmission system according to the invention in a first embodiment.

FIG. 2A shows a graph view of the variation in respect of time of the error rate ER according to a first embodiment. As long as the error rate ER is below the first threshold value 151*a*, for example 40%, output of the audio signal to be reproduced takes place. If however as illustrated at time t1 the error rate is greater than the first threshold value 151*a* then the audio output is deactivated and the system is thus muted. An audio output is activated again only when the error rate falls below a second threshold value 151*b*, for example 1%, for a given period of time. In FIG. 2A the error rate ER falls at the time t2 below the second threshold value 151*b* and has to remain there for a period from t2 to t3 before the audio output is re-activated. Thus in the time interval tM, that is to say between t1 and t3, the system is muted and no audio output takes place.

Figure 2B:
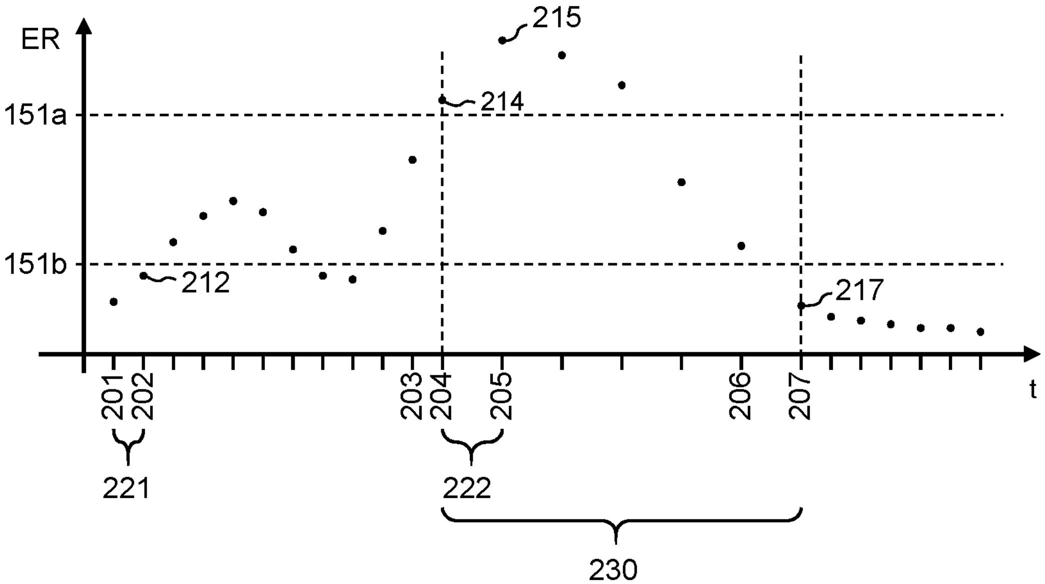
FIG. 2B shows a graph view of the variation in respect of time of an error rate in the wireless transmission in the digital wireless audio transmission system according to the invention in a second embodiment.

FIG. 2B shows a graph view illustrating the variation in respect of time of the error rate ER according to a second embodiment. This embodiment does not provide for ascertaining the error rate ER continuously in relation to time, but an error rate is respectively ascertained at a discrete moment in time, that rate relating to a respective time window which has just expired. The error rate 212 is accordingly ascertained by the errors being counted in the time window from the moment in time 201 to the moment in time 202 in an error counter and by the number of transmitted audio signals being counted for the same time window in a sample counter. With the number of errors both the errors 112 detected by the high frequency analysis 110 and also the errors 122 detected by the decoder 120 can be taken into consideration. The value of the error rate ER 212 at the moment in time 202 is then afforded by division of the state of the error counter by the state of the sample counter. In this case the time window is of the first duration 221 which has elapsed from the moment in time 201 to the moment in time 202. The first duration 221 can be for example 100 ms. After calculation of the error rate both counters are set to zero so that the error rate ER respectively takes account of the time window which has elapsed since the previous calculation of the error rate.

In the configuration shown by way of example in FIG. 2B output of the audio signal is firstly activated. At the moment in time 204 the error rate 214 is ascertained, relating to the time window from the moment in time 203 to the moment in time 204. As that error rate 214 is above the first threshold value 151*a* output of the audio signal is deactivated at that time 204. The receiving unit 100 therefore switches into the “muted” state. In that state a second duration 222 can optionally be used for the length of the time window, to which a calculated error rate ER respectively relates. The error rate 215 which is calculated at the moment in time 205 thus relates to a time window which is between the moment in time 204 and 205 and which is of a duration 222 of for example 200 ms.

At the moment in time 207 the example in FIG. 2B involves calculating an error rate 217 which is below the second threshold value 151*b*. Because the error rate 217 relates to the time window from the moment in time 206 to the moment in time 207, this means that the error rate has remained on average below the second threshold value 151*b* for the entire duration of that time window. This ensures that a corresponding improvement in transmission quality has actually occurred. At the moment in time 217 therefore the audio output is activated again and the receiving unit 100 thus goes into the “unmuted” state.

The length of the time window used for analysis of the error rate ER is again set to the first duration 221 in the “unmuted” state. The first duration 221 (unmuted) is preferably shorter than the second duration 222 (muted) as a fast reaction on the part of the system is desired in the “unmuted” state in order to interrupt the audio output as quickly as possible when the audio quality is no longer acceptable while in the “muted” state it is possible to ensure by the longer duration 222 that the transmission functions in stable fashion again before the audio output is re-activated. Optionally a user of the system can adjust the two values for the first duration 221 and the second duration 222. A typical value for the first duration 221 is 100 ms while a typical value for the second duration is 200 ms. A low limit for the selectable range of both values can preferably be established at 10 ms in order to ensure that a relatively large number of sample values is taken into consideration and thus an unnecessary reaction on the part of the system is prevented in the event of very short disturbances in the transmission.

Optionally a user can also adjust the first threshold value 151*a* and the second threshold value 151*b*. A typical for the first threshold value 151*a* is 40% while a typical value for the second threshold value 151*b* is 1%. By the choice of the first threshold value 151*a* the user can establish the error rate up to which he considers acceptable the quality of the audio signal produced by estimation and possibly error concealment, in respect of his use. By the choice of the second threshold value 151*b* he can establish the limit as from which a sufficiently stable transmission is again assumed to occur in his specific situation of use. According to the invention the second threshold value 151*b* is less than the first threshold value.

Optionally the values selected by the user for the first and second duration 221, 222 as well as the first and second threshold values 151*a*, 151*b* can be stored jointly with an item of information about the respective situation of use so that the stored values can be later used again without a renewed manual input. The information about the situation of use can include for example the location of an event.

Figure 3:
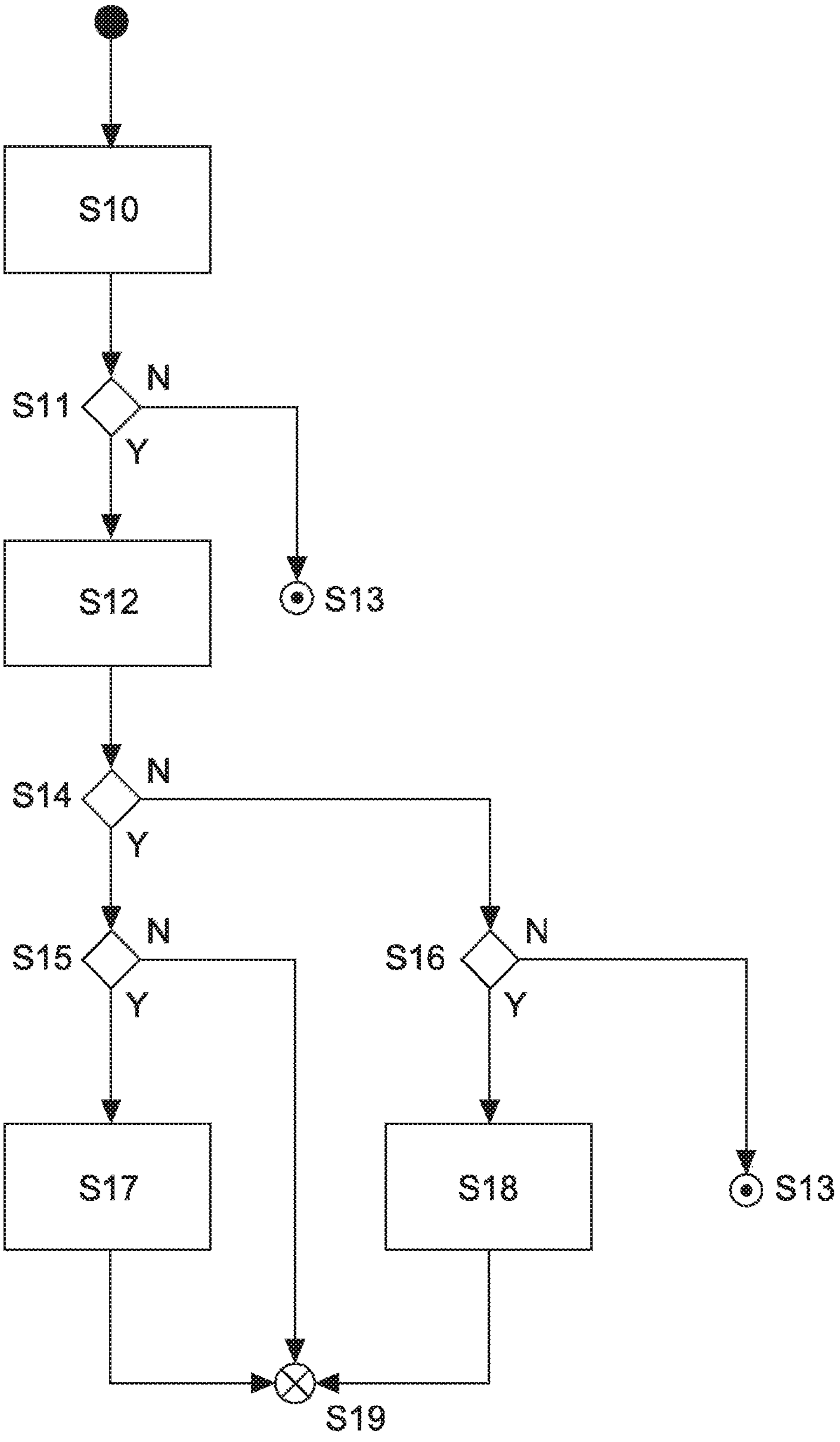
FIG. 3 shows a flow chart for a digital wireless audio transmission system according to the invention.

FIG. 3 shows a flow chart relating to operation of the digital wireless audio transmission unit according to the invention. During the transmission the received data packets are continuously processed and in that respect in step S10 in the sample counter the number of the received sample values and in the error counter the number of the errors detected in that case are summed up. At the query S11 the procedure then involves checking whether the end of the time window just being considered is reached. If the end of the time window is not reached then the flow progresses to step S13 and operation of the audio transmission system is not influenced. If however the end of the time window is reached then the flow progresses to step S12 where the error rate ER is calculated by division of the value of the error counter by the value of the sample counter and then both counters are reset to the value zero. In addition the end of the following time window is established, in which case firstly the length of the time window which has just expired is used again. The query S14 then involves checking whether the system is in the "muted" state. If that is the case then query S15 involves checking whether the error rate ER is below the second threshold value 151*b*. If that is not the case the system remains in the "muted" state and processing continues unchanged with the step S19. If however it is established at the query S15 that the error rate ER is below the second threshold value 151*b* then the system is put into the "unmuted" state in step S17 by the audio output being activated and the duration to be used for the next time window is set to the first duration 221 and used for establishing the next window end before the process proceeds at step S19.

If it were established at the query S14 that the system is not in the "muted" state then the process continues at the query S16. There a check is made to ascertain whether the error rate ER is above the first threshold value 151*a*. If that is not the case the system then remains in the "unmuted" state and processing proceeds unchanged at the step S13. If however it is established at the query S16 that the error rate ER is above the first threshold value 151*a* then the system is put into the "muted" state in step S18 by the audio output being deactivated and the duration to be used for the next time window is set at the second duration 222 and is used for establishing the next window end before the process proceeds at step S19.

According to the invention wireless audio real time streaming is effected for example from a digital wireless microphone as the transmitter. In that respect the invention concerns in particular the wireless receiver which receives the audio data from the digital wireless microphone.

According to the invention the decoder 120 converts the received streaming data into audio samples or audio data. The audio data or samples are then passed to the audio processing unit 130 where further audio processing or conversion possibly takes place. For that purpose the audio processing unit 130 is capable of activating or deactivating the output audio signal and can thus mute the system.

According to the invention the high frequency analysis unit 110 can detect errors in the wireless transmission for example by a CRC mechanism.

According to the invention the decoder 120 can implement error concealment. The second items of error information 122 can include information as to whether error concealment by the decoder 120 was successful or required.

The error detection unit 140 can have two different sampling times and two different threshold values. A first time interval can be associated with the first threshold value 151*a* and a second time interval can be associated with the second threshold value 151*b*.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

The invention claimed is:

1. A digital wireless audio transmission system comprising:

a wireless receiving unit for receiving wirelessly transmitted high frequency signals;

wherein the wireless receiving unit has:

a high frequency analysis unit configured to convert the high frequency signal into received data;

a decoder configured to decode the received data into digital audio data;

an audio processing unit configured to:

process the digital audio data;

output an audio output signal; and activate or deactivate the audio output signal; and an error detection unit configured to detect transmission errors and an error rate associated with the transmission errors;

wherein the decoder is adapted to, upon the occurrence of errors in the wireless transmission, produce digital audio data from error-affected received data by estimation;

wherein the error detection unit is adapted to:

compare the error rate to a first threshold value and a second threshold value, wherein the second threshold value is lower than the first threshold value;

wherein the audio processing unit is configured to account for audio artefacts and a hysteresis effect by:

deactivating the audio output when the error rate exceeds the first threshold value; and re-activating the audio output only when the error rate falls below the second threshold value and when the error rate remains below the second threshold for a pre-determined period of time.

2. The digital wireless audio transmission system as set forth in claim 1;

wherein the decoder is adapted to perform an error concealment.

3. The digital wireless audio transmission system as set forth in claim 1;

wherein the transmission system streams wireless audio with low latency.

4. The digital wireless audio transmission system as set forth in claim 1;

wherein the high frequency analysis unit is adapted to detect first errors in the wireless transmission and to output first items of information in respect of the detected first errors to the error detection unit; and wherein the decoder is adapted to detect second errors and to output second items of information in respect of the detected second errors to the error detection unit.

5. The digital wireless audio transmission system as set forth in claim 1;

wherein the time window for ascertaining the error rate with activated audio output is of a first duration; and wherein the time window for ascertaining the error rate with deactivated audio output is of a second duration that is longer than the first duration.

6. The digital wireless audio transmission system as set forth in claim 5;

wherein the digital wireless audio transmission system is configured to allow a user to adjust the first and second durations.

7. The digital wireless audio transmission system as set forth in claim 1;

wherein the digital wireless audio transmission system is configured to allow a user to adjust the first and second threshold values.

8. The digital wireless audio transmission system as set forth in claim 1;

wherein the duration of a time window for detecting the error rate is at least 10 ms.

* * * * *